(12) United States Patent
Itoh et al.

(10) Patent No.: US 7,572,865 B2
(45) Date of Patent: Aug. 11, 2009

(54) POLYESTER FILMS

(75) Inventors: Katsuya Itoh, Ohtsu (JP); Shinya Higashiura, Ohtsu (JP); Toru Kotani, Ohtsu (JP); Shinji Fujita, Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 72 days.

(21) Appl. No.: 10/501,092

(22) PCT Filed: Jan. 9, 2003

(86) PCT No.: PCT/JP03/00095

§ 371 (c)(1),
(2), (4) Date: Jan. 25, 2005

(87) PCT Pub. No.: WO03/059996

PCT Pub. Date: Jul. 24, 2003

(65) Prior Publication Data

US 2005/0118442 A1    Jun. 2, 2005

(30) Foreign Application Priority Data

Jan. 11, 2002  (JP) .............................. 2002-005098

(51) Int. Cl.
*C08L 67/02* (2006.01)
(52) U.S. Cl. ...................... 525/444; 428/35.8
(58) Field of Classification Search ................ 525/444; 428/35.8
See application file for complete search history.

(56) References Cited

U.S. PATENT DOCUMENTS 4,774,114 A * 9/1988 Moritani et al. ............ 428/36.6
5,153,302 A * 10/1992 Masuda et al. .............. 528/272
6,780,482 B2 * 8/2004 Majima et al. ............. 428/35.8

FOREIGN PATENT DOCUMENTS

| JP | 5-331302 | 12/1993 |
|---|---|---|
| JP | 7-145252 | 6/1995 |
| JP | 8-3430 | 1/1996 |
| JP | 8-120068 | 5/1996 |
| JP | 9-143349 | 6/1997 |

(Continued)

*Primary Examiner*—Randy Gulakowski
*Assistant Examiner*—Alicia M Toscano
(74) *Attorney, Agent, or Firm*—Westerman, Hattori, Daniels & Adrian, LLP.

(57) ABSTRACT

The present invention is a polyester film obtained by blending 10-90 wt % of polyester (A) containing ethylene terephthalate as a main constituent component and 90-10 wt % of crystalline polyester (B) different from this polyester (A), which has a half value width of a recrystallization peak obtained by a differential scanning calorimeter (DSC) by lowering temperature of not more than 0.25. The crystalline polyester (B) is preferably a polyester selected from polybutylene terephthalate (PBT), polytrimethylene terephthalate (PTT) and polyethylene 2,6 naphthalate (PEN). According to the polyester of the present invention, a polyester film superior in mechanical characteristic and design property and having high crystallinity, which can be used alone or adhered to a metal sheet and which is free of whitening even when the film is heat treated at near or not lower than the melting point can be obtained, and further, a polyester film having such superior resistance to whitening (design property), which is not easily damaged, can be obtained.

6 Claims, 1 Drawing Sheet

FOREIGN PATENT DOCUMENTS

| | | |
|---|---|---|
| JP | 10-110046 | 4/1998 |
| JP | 10-195210 | 7/1998 |
| JP | 2001-335682 | 12/2001 |
| JP | 2002-69277 | 3/2002 |
| JP | 2002-179892 | 6/2002 |
| JP | 2002-275273 | 9/2002 |
| JP | 2002-321277 | 11/2002 |
| JP | 2003-26824 | 1/2003 |
| WO | 00/09593 | 2/2000 |
| WO | WO 0192417 A1 * | 12/2001 |

* cited by examiner

POLYESTER FILMS

TECHNICAL FIELD

The present invention relates to a polyester film beneficial as a film for packaging of various foods, general industrial use, optical use, electric materials and form processing, as well as a constituent material of a film laminated metal sheet, and the like.

BACKGROUND ART

For example, since a metal can, which is one form of packaging container for food and beverage, has many advantages in that long-term preservation of the contents is possible because it is superior in mechanical strength, packing the contents at a high temperature and sealing as is, as well as easy sterilization treatment such as retort treatment etc. are available, which leads to high reliability in safety and hygiene as a packaging container, and further, preservation of the contents in a heated state is possible and separate collection of can after use is relatively easy. Thus, various contents have been packed therein and metal cans have been used in a large quantity in recent years.

Conventionally, paints containing a thermosetting resin as a main component have been applied to metal cans, because the inner and outer surfaces of a metal can for food and beverage should maintain flavor of the contents and prevent corrosion of the metal can, or for the purpose of improving good appearance of the outer surface of the can and protecting printed surfaces. However, since such metal cans require use of a large amount of solvents during production, they pose problems of an influence on the environment due to de-solventing during production, problems in hygienic aspects due to residual solvent in the coating, degraded flavor property due to residual oligomer produced by defective reaction during thermosetting and the like.

To overcome these problems, it has been proposed to laminate a plastic film on a metal, and, since more superior aspects have been found in terms of adhesive power, heat resistance, mechanical strength, flavor property, processing suitability and the like than other resins, of the thermoplastic resins, a polyester film is more often laminated on a metal sheet. As a metal can made by processing such a film-laminated metal sheet, what is called a 3-piece can (hereinafter to be abbreviated as a 3P can) and a 2-piece can (hereinafter to be abbreviated as a 2P can) have been proposed. Of these, prevailing of 2P cans has been desired from the aspect of seamless processing.

As a general production method of 2P can, a typical method comprises producing a seamless can by laminating a plastic film, punching a laminated metal sheet with a can making machine and subjecting the sheet to a drawing and ironing step. In such a can making step, a film is required to have formability to follow spreading of a metal sheet while receiving a shear of drawing and ironing, without being subject to crack and detachment from a metal sheet, and is also required to be free of whitening of film due to heating in a can making step, and the like.

In response to such required characteristics, a polyester film containing a polyethylene terephthalate polyester resin having a particular intrinsic viscosity and a polybutylene terephthalate polyester resin having a particular intrinsic viscosity has been proposed.

For example, in U.S. Pat. Nos. 2,882,985, 3,020,731 and the like, by optimizing semi crystallization temperature and semi crystallization time of the polyethylene terephthalate polyester resin and the polybutylene terephthalate polyester resin to be added, the followability a film to deformation of metal and retort whitening are suppressed.

In JP-A-10-195210, JP-A-10-110046 and the like, moreover, followability of a film to deformation of metal and flavor property by heat treatment (crystallization treatment) after lamination are improved by optimizing thermal property and planar orientation of a polyethylene terephthalate polyester resin and a polybutylene terephthalate polyester resin to be added. In so doing, when transesterification has proceeded too much between two kinds of polyesters, the crystallinity of the film cannot be increased. Therefore, for example, melting time of resin during film forming and the amount of heat applied to a film during subsequent stretching and heat treatment step of the film are designed to be decreased.

Moreover, JP-A-2002-179892, JP-A-2002-321277 and the like propose a polyester film which, though it is a blend film of a polyethylene terephthalate (PET) polyester resin and a polybutylene terephthalate (PBT) polyester resin, is alleged to be able to maintain heat seal property and formability because PET phase and PBT phase comprise independent crystals. This film is considered to be usable for forming transfer, forming container, metal adhering and the like, and forming a film by extruding a blended resin by a vent-type extruder to give a film has been proposed to make PET phase and PBT phase independent crystals.

However, according to the consideration of the present inventors, it has been found that, in conventional blend type polyester films proposed above, when a film is melted at a near melting point or not lower than the melting point, adhered to a metal and the like and then cooled, problems occur in that the film is whitened and the design of the film is degraded. In addition, a problem has been found that the film on a metal sheet is damaged easily.

DISCLOSURE OF THE INVENTION

In view of the above-mentioned situation, the present invention aims at providing a polyester film superior in mechanical characteristic and design property, which can be adhered to a metal sheet and which is free of whitening even when the film is heat treated at near or not lower than the melting point. Moreover, the present invention aims at providing a polyester film having the above-mentioned superior characteristics, which is not easily damaged after laminating on a metal sheet.

The present inventors have studied the cause of the whitening of a conventional polyester film made from a blend of a polyethylene terephthalate polyester resin and a polybutylene terephthalate polyester resin, which occurs along with lowering of the temperature after melting at near or not lower than the melting point, and considered that such whitening occurs because the size of a crystal produced in temperature lowering process after melting of the film is too big, and the increased crystal size of the film is affected by the dispersion state of the film-constituting polyester (i.e., PET polyester resin and PBT polyester resin), and further proceeded with the investigation from such aspect, which resulted in the completion of the present invention.

Accordingly, the present invention relates to (1) a film made from a polyester resin composition comprising 10-90 wt % of polyester (A) comprising ethylene terephthalate as a main constituent component and 90-10 wt % of crystalline polyester (B) different from said polyester (A), which film shows a half value width of recrystallization peak obtained by a differential scanning calorimeter (DSC) by lowering temperature of not more than 0.25, (2) the polyester film of the above-mentioned (1), wherein the polyester resin composition comprises 10-70 wt % of polyester (A) comprising ethylene terephthalate as a main constituent component and 90-30 wt % of crystalline polyester (B), and the crystalline polyester (B) is a polyester selected from polybutylene terephthalate (PBT), polytrimethylene terephthalate (PTT) and polyethylene-2,6-naphthalate (PEN), (3) the polyester film of the above-mentioned (1) or (2), wherein a peak temperature (Tc2) of a recrystallization peak is not less than 180° C., (4) the polyester film of any of the above-mentioned (1)-(3) wherein the polyester film has a reduced viscosity of not less than 0.80, (5) the polyester film of any of the above-mentioned (1)-(4), which is used for laminating on a metal sheet, and (6) the polyester film of any of the above-mentioned (1)-(4), which is used for form processing.

Figure 1:
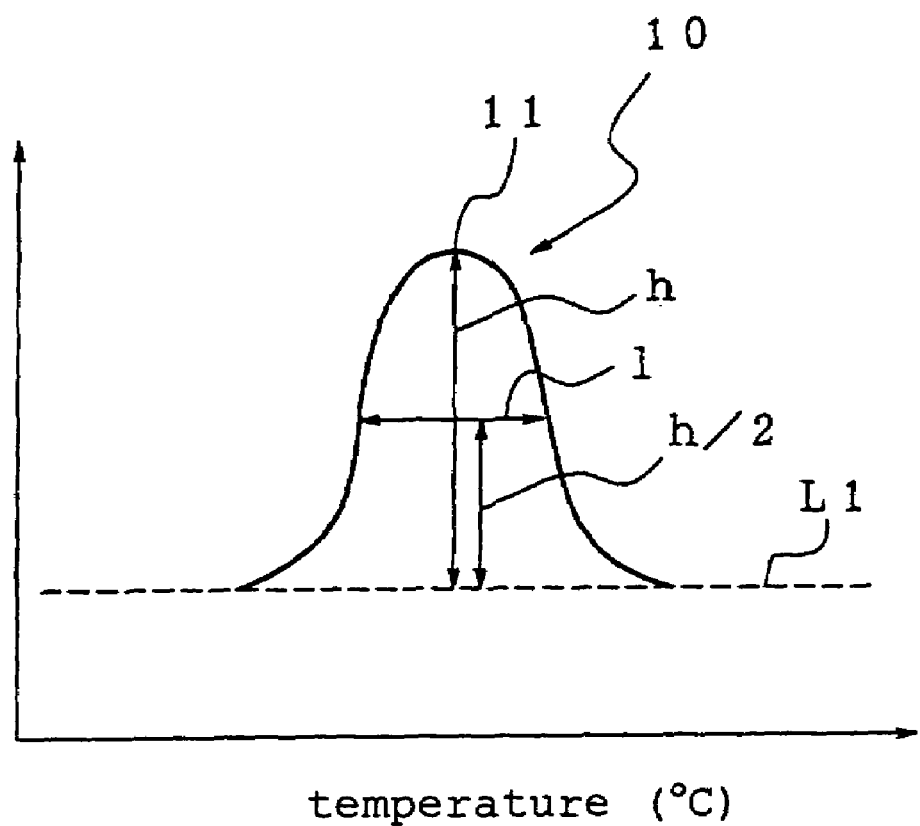
FIG. 1 is a schematic view of a chart showing a recrystallization peak of a polyester film during a temperature decrease by a differential scanning calorimeter (DSC).

For explanation of the symbols in the FIGURE, 10 is a recrystallization peak, 11 is a peak top (vertex), L1 is a base line, h is a height from the base line to the peak top, and l is a temperature width at ½ h.

DETAILED DESCRIPTION OF THE INVENTION

The polyester (A) comprising ethylene terephthalate as a main constituent component (hereinafter to be also referred to as polyester A) in the present invention refers to a polyester comprising ethylene terephthalate in not less than 80 mol %, preferably not less than 90 mol %, of the polyester component.

As used herein, the polyester is a polymer comprising a dicarboxylic acid component and a glycol component, and the dicarboxylic acid component optionally selected from dicarboxylic acid components other than terephthalic acid, such as aromatic dicarboxylic acids (e.g., naphthalene dicarboxylic acid, diphenyl dicarboxylic acid, diphenylsulfon dicarboxylic acid, diphenoxyethane dicarboxylic acid, 5-sodiumsulfoisophthalic acid, phthalic acid and the like), aliphatic dicarboxylic acids (e.g., oxalic acid, succinic acid, adipic acid, sebacic acid, dimer acid, maleic acid, fumaric acid and the like), alicyclic dicarboxylic acids (e.g., cyclohexane dicarboxylic acid and the like), oxycarboxylic acids (e.g., p-oxybenzoic acid and the like) and the like may be copolymerized. In addition, a glycol component optionally selected from glycol components other than ethylene glycol, such as aliphatic glycols (e.g., trimethylene glycol, butanediol, pentanediol, hexanediol, neopentyl glycol and the like), alicyclic glycols (e.g., cyclohexanedimethanol and the like), aromatic glycols (e.g., bisphenol A, bisphenol S and the like) and the like may be copolymerized. Two or more kinds of these dicarboxylic acid components and glycol components may be used in combination.

The melting point of polyester (A) is preferably 240° C. -265° C.

The reduced viscosity of polyester (A) is preferably 0.55-0.90, more preferably 0.58-0.80. When the reduced viscosity becomes smaller than this range, a film having mechanical strength standing practical use is difficult to obtain, whereas when it exceeds this range, the film unpreferably loses heat press sealability to a metal sheet.

The crystalline polyester (B) (hereinafter to be also referred to as polyester B) in the present invention refers to one or more kinds of polyesters selected from polybutylene terephthalate (PBT) polyester, polyethylene-2,6-naphthalate (PEN) polyester, polytrimethylene terephthalate (PTT) polyester, polyhexamethylene terephthalate (PHT) polyester and polypentamethylene terephthalate (PPT) polyester, which is preferably polybutylene terephthalate (PBT) polyester, polyethylene-2,6-naphthalate (PEN) polyester, polytrimethylene terephthalate (PTT) polyester, polyhexamethylene terephthalate (PHT) polyester or polypentamethylene terephthalate (PPT) polyester. As used herein, polyester is a polymer comprising a dicarboxylic acid component and a glycol component. These crystalline polyesters are all preferably homopolyesters (i.e., polybutylene terephthalate (PBT), polyethylene-2,6-naphthalate (PEN), polytrimethylene terephthalate (PTT), polyhexamethylene terephthalate (PHT), polypentamethylene terephthalate (PPT)), and may be copolymerized polyesters wherein the homopolyester is further copolymerized with other dicarboxylic acid component and/or glycol component. The dicarboxylic acid component as such a copolymerizable component includes, for example, any dicarboxylic components selected from aromatic dicarboxylic acids such as diphenyl dicarboxylic acid, diphenylsulfon dicarboxylic acid, diphenoxyethane dicarboxylic acid, 5-sodiumsulfoisophthalic acid, phthalic acid and the like, aliphatic dicarboxylic acids such as oxalic acid, succinic acid, adipic acid, sebacic acid, dimer acid, maleic acid, fumaric acid and the like, alicyclic dicarboxylic acids such as cyclohexane dicarboxylic acid and the like, oxycarboxylic acids such as p-oxybenzoic acid and the like, and the like, and as the glycol component, any glycol component selected from aliphatic glycols such as ethylene glycol, trimethylene glycol, butanediol, pentanediol, hexanediol, neopentyl glycol and the like, alicyclic glycols such as cyclohexanedimethanol and the like, aromatic glycols such as bisphenol A, bisphenol S and the like, and the like, where two or more kinds of these dicarboxylic acid components and glycol components may be each used in combination. The amount of copolymerization of these dicarboxylic components and/or glycol components is in such a range that does not impair high crystallinity of the polyester, which is generally not more than 20 mol % of the entire polyester.

The melting point of polybutylene terephthalate (PBT) polyester is preferably 215-235° C., the melting point of polyethylene-2,6-naphthalate (PEN) polyester is preferably 260-275° C., the melting point of polytrimethylene terephthalate (PTT) polyester is preferably 230-245° C., the melting point of polyhexamethylene terephthalate (PHT) polyester is preferably 150-170° C., and the melting point of polypentamethylene terephthalate (PPT) polyester is preferably 130-150° C.

In the present invention, the crystalline polyester (B) is particularly preferably selected from polybutylene terephthalate (PBT) polyester, polytrimethylene terephthalate (PTT) polyester and polyethylene-2,6-naphthalate (PEN) polyester, and specifically preferably polybutylene terephthalate (PBT) polyester or polytrimethylene terephthalate (PTT).

In the present invention, the reduced viscosity of crystalline polyester (B) is preferably 0.80-2.20, more preferably 0.85-1.50. When the reduced viscosity is lower than this range, a film having mechanical strength capable of standing practical use is difficult to obtain, whereas when it exceeds this range, the film unpreferably loses heat press sealability to a metal sheet.

In the polyester film of the present invention, the mixing ratio of polyester A and polyester B (A/B) is generally 10-90 wt %/90-10 wt %, preferably 10-70 wt %/90-30 wt %, more preferably 35-65 wt %/65-35 wt %. When the amount of polyester A exceeds such range (when the amount of polyester B is small), the form processability of the film is degraded, and particularly, when a laminated metal sheet, wherein this film is laminated on a metal sheet, is used for can making, a can making failure occurs and the film easily breaks. When the amount of polyester B is high (when the amount of polyester A is small), whitening of the film, which occurs when the film is melted to a temperature near or not lower than the melting point thereof and then cooled, cannot be suppressed sufficiently.

FIG. 1 is a simplified view of a chart showing recrystallization peak of a crystalline polyester film during a temperature decrease by a differential scanning calorimeter (DSC). By the "half value width of a recrystallization peak obtained by a differential scanning calorimeter (DSC) by lowering temperature" in the present invention is meant temperature width l divided by height h (l/h), wherein h is a height from a base line L1 to a peak top 11 in a recrystallization peak (chart) 10 of a polyester film as measured by a differential scanning calorimeter (DSC), and l is a temperature width at a height of 0.5 h. The rate of crystallization during temperature decrease in a recrystallization process of a polyester film can be known from the half value width (l/h) of such recrystallization peak, wherein the smaller the value is, the quicker the (heat generation) thermolysis occurs, indicating a rapid crystallization rate.

In other words, the present invention is based on the finding that, when polyester A and polyester B are blended at the above-defined mixing ratio and the obtained film forms a dispersion state of polyester such that the half value width (l/h) of a recrystallization peak obtained by a differential scanning calorimeter (DSC) by lowering temperature becomes not ore than 0.25, the film is free of whitening even when it is melted to a near or not lower than the melting point and then cooled. A film having a half value width of crystallization peak of not more than 0.25 shows high crystallization rate during cooling process from the melting point in temperature decrease, and since microcrystal that does not contribute to the diffusion of visible light is formed in a large amount inside the film, the film is not whitened and maintains processing characteristic. When the half value width (l/h) of the recrystallization peak is greater than 0.25, crystallization rate is slow in the cooling process of decreasing temperature from the melting point, and microcrystals grow to the level that diffuses the visible light, which in turn causes whitening of the film.

In the present invention, the half value width (l/h) of such a recrystallization peak is preferably not more than 0.22, more preferably not more than 0.20. When a polyester film shows such preferable half value width (l/h) of recrystallization peak, more superior resistance to whitening is shown.

In the present invention, a polyester film showing a half value width of a recrystallization peak obtained by a differential scanning calorimeter (DSC) by lowering temperature of not more than 0.25 can be achieved by controlling the dispersion state of polyester A and polyester B in a polyester mixture during a film production process.

Conventionally, when a blend type polyester film is produced, polyester chips to be blended are generally mixed (dry blend) before feeding into an extruder, and such chip mixture is fed into an extruder and melt-mixed. However, according to this method, plural polyester chips substantially almost simultaneously start melting. Therefore, plural polyesters to be blended are melt-mixed for a long time, and compatible polyesters of PET and PBT become a finely dispersed state. The conventional polyester films comprising a blend of a PET polyester resin and a PBT polyester resin explained under the section of Prior Art are all produced by this method, and the problem of whitening, which occurs in conventional polyester films comprising a blend of a PET polyester resin and a PBT polyester resin when laminating the film on a metal and the like upon melting to a near or not lower than the melting point, is considered to occur because both polyesters (PET polyester resin, PBT polyester resin) constituting the film are not copolymerized, and even if they are dispersed in substantially mutually independent phases, since they are in a finely dispersed state (namely, subject to an influence of each other due to the state of fine dispersion), independent crystallinity of the both cannot be maintained. As a result, crystallization of the film does not proceed easily, thus leading to the whitening of the film. For example, therefore, when a blend film of PET (melting point 255° C.) and PBT (melting point 220° C.) is to be produced by a single extruder having a uniaxial or twin screw, the temperature of the extruder needs to be set to a temperature not lower than the melting point of PET, because PET has a high melting point, and in view of the stability and the like of the production, it is generally set to not lower than 280° C. However, when PBT is heated to a temperature of not less than 280° C., decomposition that starts from around 260° C. proceeds more quickly, and the molecular weight decreases due to the heat of the extruder. As a result, compatibility with PET becomes still higher, resulting in a tendency toward uniformization to become finely dispersed. Thus, the two tend to copolymerize (transesterification) in the melt-mixing process, and even if they are not copolymerized, the individual crystallinity is impaired and they become highly susceptible to an influence of each other, which in turn makes it difficult to maintain independence of each crystallinity, thus decreasing crystallization rate of the film.

The polyester film of the present invention is applied to a variety of uses such as for packaging of various foods, general industrial purposes, optical use, electric materials, metal lamination, form processing and the like. Therefore, not only the occurrence of whitening should be avoided even if the film is melted at near or not lower than the melting point, but also superior formability (formability of film alone and formability in laminating processing on metal sheet) and superior flavor property should be achieved, and further, whitening of film after forming should be avoided. To meet these goals, the crystallization rate and crystallinity of the film should be controlled by sufficiently suppressing copolymerization ratio of polyester A and polyester B (transesterification of the two). In the present invention, for example, polyester A chip and polyester B chip are not mixed (dry blended) but fed into independent extruders and melted therein, polyester A and polyester B melted in these independent extruders and prior to extrusion thereof from a die are mixed and led to a die, which is followed by steps of melting, extrusion and film forming, thereby shortening the contact time of polyester A and polyester B in a molten state, and forming a film while maintaining a "crudely mixed" dispersion state wherein polyester A and polyester B are each dispersed in the state of a relatively large crystal phase. A film, wherein polyester A and polyester B are each dispersed in the state of a relatively large crystal phase, maintains independence of crystallinity of each polyester (polyester A and polyester B), allowing rapid progress of crystallization of the film, whereby the half value width (l/h) of recrystallization peak of the film is considered to become not more than 0.25.

In this way, the polyester film of the present invention can be produced by independently melting polyester (A) comprising ethylene terephthalate as a main constituent component and crystalline polyester (B) different from the polyester (A), mixing them in a molten state at a predetermined mixing ratio, and forming the mixture. In conventional general production of a polyester film, a material (polyester) constituting a film having a single layer is fed into a single extruder, melted, extruded and formed into a film. The polyester films described in patent references exemplarily shown in the section of Prior Art comprise two or more kinds of different starting materials (polyesters), but a single extruder is used to melt and mix the two or more kinds of different starting materials (polyesters) all at once. This is assumed to result from the consideration of stability and economical aspect of film-forming operation, due to which the production of a higher quality film seems to have been difficult. In contrast, according to the present invention, it has been found that a film having improved quality can be obtained while maintaining the stability of film-forming by separately melting different starting materials (two or more kinds of polyesters), mixing them in a molten state and extruding the mixture. In the present invention, while a method comprising melting individual starting materials (two or more kinds of polyesters) in separate extruders and mixing them in a molten state (a method using two or more extruders in parallel) is preferable, production by a single extruder is also possible. In the case of production by a single extruder, however, an extruder having a double flight type compression part (compression zone) of a screw needs to be used. As used herein, by the "double flight type" is meant a constitution wherein a compression part (compression zone) of a screw is a double helical structure with a subflight having an outer diameter a little smaller than the outer diameter of the main flight installed between the main flights, which is characterized in that the subflight separates a solid phase and a molten part of the polymer. As an extruder having a screw with such a double flight type compression part (compression zone), for example, UB series (product name) of MITSUBISHI HEAVY INDUSTRIES, LTD., BARR series (product name) of The Japan Steel Works, LTD. and the like can be mentioned. As long as an extruder comprises a screw having a double flight type compression part, a single extruder can also produce the polyester film of the present invention, assumedly because of the following reasons. That is, for example, when PET and PBT are blended, PBT that starts melting first and PET that remains solid at that time point are separated in the former flight of the compression part of an extruder, which shortens the contact time of PET and PBT in a molten state and achieves "crude mixing". In this case, the single extruder is preferably a rapid compression type having a smaller compression ratio (not more than 2.0). This is because, when a slow compression type having a greater compression ratio (more than 2.0) is used, even if the apparent temperature can be set low, the amount of self heat generation at a compression part (compression zone) of the extruder increases, and the temperature of the resin becomes the temperature set or higher than that, and therefore, when PTT, PBT, PHT and the like having a particularly low melting point are used from crystalline polyester resin (B), decomposition thereof unpreferably tends to occur easily.

In the present invention, moreover, a rapid compression type extruder refers to one containing a compression part (compression zone) having an L/D of less than 25, preferably less than 20, more preferably less than 15, and a slow compression type extruder refers to one containing a compression part (compression zone) having an L/D of not less than 25. As used herein, L/D is a ratio of an effective length (L) and an outer diameter (D) of a screw of a compression part (compression zone), wherein the outer diameter (D) is an average outer diameter of the effective length of a screw.

As mentioned above, while the polyester film of the present invention can be produced by a single extruder, since a single extruder permits a narrow range of tolerance of mixing conditions, a method comprising separately melting plural polyesters in individual extruders is preferable. To be specific, as an extruder to be used for separately melting polyester A and polyester B, an extruder having a compression ratio of 1.1-3.1 (preferably 1.5-2.8) and an L/D of 20-35 (preferably 25-30) is preferable. Such extruder may be a uniaxial extruder or a biaxial extruder. As used herein, the L/D is a ratio of an effective length (L) and outer diameter (D) of a screw of an extruder, wherein the outer diameter (D) is an average outer diameter of the effective length of a screw. The compression ratio is calculated by (groove depth of feed zone)÷(groove depth of metering zone). The groove depth of the feed zone and metering zone is calculated from the outer diameter and groove diameter of the screw, respectively.

As a machine to mix the separately melted polyester A and polyester B, for example, uniaxial extruder, biaxial extruder, dynamic mixer, static mixer (Noritake Co., Limited) and the like can be mentioned, with preference given to uniaxial extruder and static mixer.

As an extruder to mix the melted polyester A and polyester B, since uniform mixing of the melted polyester A and melted polyester B to the degree they become compatible with each other (transesterification) is not preferable, one having a small compression ratio is preferably used. To be specific, one having a compression ratio of 1.1-3.8 (preferably 1.3-3.0) is preferable. It is also preferable to use an extruder having an L/D of 20-35 (preferably 25-30), from the aspect of crude mixing of polyester A and polyester B, and use of an extruder having an L/D of the compression part of 5-25, preferably 10-20, is preferable. The L/D compression ratio here means the same as the aforementioned, and L/D of the compression part (compression zone) is the ratio of length (L) and outer diameter (D) of the compression part (compression zone) of a screw.

The extruding conditions (forming conditions) of the molten resin mixture are preferably not more than 265° C. of resin temperature and do not create an area of not less than 275° C. (preferably not less than 270° C.) in the temperature setting from the cylinder part to T-die. This is out of the possibility that, when these conditions are not met, a higher temperature increases compatibility of polyesters A, B, which in turn results in a failure to suppress whitening of the object film, or causes decrease of the viscosity (molecular weight) of the film, thereby lowering the scratch resistance of the produced film.

When polyester A and polyester B have higher compatibility, transesterification occurs between polyester A and polyester B to form a copolymer of polyester A and polyester B, an ethylene terephthalate structure, which is the main component structure of polyester A, becomes at random, thus impairing the characteristic rigidity thereof, as well as butylene terephthalate structure, trimethylene terephthalate structure, hexamethylene terephthalate structure, pentamethylene terephthalate structure or ethylene-2,6-naphthalate structure, which is the main component structure of polyester B, becomes at random, thus impairing the characteristic high crystallinity. As a result, crystallization rate becomes slow and coarse spherical crystal that could cause whitening of the film easily occurs.

While means are known to suppress side reaction such as transesterification and the like in a film composition containing polyethylene terephthalate polyester and other crystalline polyesters, for application in the industrial film production, a method comprising adding an organic phosphorus compound (catalyst) is preferable for suppression of copolymerization of polyester A and polyester B. In the present invention, too, addition of such organic phosphorus compound (catalyst) enhances the transesterification suppressing effect.

In the present invention, such organic phosphorus compound (catalyst) having a melting point of not less than 200° C. is preferable from the aspect of stability in an extruder (mixing machine). For example, dimethyl methylphosphonate, diphenyl methylphosphonate, dimethyl phenylphosphonate, diethyl phenylphosphonate, diphenyl phenylphosphonate, dimethyl benzylphosphonate, diethyl benzylphosphonate, diphenylphosphinic acid, methyl diphenylphosphinate, phenyl diphenylphosphinate, phenylphosphinic acid, methyl phenylphosphinate, phenyl phenylphosphinate, diphenylphosphine oxide, methyldiphenylphosphine oxide, triphenylphosphine oxide and the like can be mentioned. Of these, those having a molecular weight of not less than 200 are particularly preferable. One or more kinds of such organic phosphorus compounds can be used. The amount of addition varies depending on the kind of the phosphorus compound, but it is generally preferably about 0.01-0.3 wt % of the total amount of the polyester to be blended. It is also preferable to have such organic phosphorus compound prekneaded with a resin, and prekneading with at least polyester A chip is more preferable.

When the polyester film is used for food, such as leverage can and the like, the organic phosphorus compound needs to be used in a compound and an amount meeting the standard of FDA (U.S. Food and Drug Administration), Japan Hygienic Olefin And Styrene Plastics Association and the like.

While a production method of the polyester film of the present invention comprising separately melting polyester A and polyester B and mixing them in a molten state has been explained in detail in the above, if a film comprising polyester A and polyester B dispersed in a state of relatively large crystal phase (i.e., "crude mixture") can be formed by other methods, whereby the half value width of a recrystallization peak during a temperature decrease by a differential scanning calorimeter (DSC) of the film can be controlled to not more than 0.25, such polyester film is also encompassed in the polyester film of the present invention.

In the polyester film of the present invention, the temperature (Tc2) of a recrystallization peak during decreasing temperature by differential scanning calorimeter (DSC) is preferably not less than 180° C., more preferably not less than 185° C., further preferably not less than 190° C., most preferably not less than 192° C. When the temperature of the recrystallization peak is such temperature, the crystallization rate of the film in the cooling process at decreasing temperature from the melting point becomes faster, and more preferable results can be obtained in the suppression of whitening of a film. When the recrystallization peak temperature is too high, such polyester film shows degraded form processability. Particularly when laminated on a metal sheet and the laminated metal sheet is subjected to can making, a can making failure occurs and the film is easily broken. Thus, a recrystallization peak temperature of not more than 250° C. is preferable.

As mentioned above, the suppression of transesterification between polyester resins to be blended acts favorably for suppression of whitening, but in the present invention, dispensability and/or compatibility of polyester A and polyester B are/is particularly degraded, in other words, each polyester is "crudely mixed" by dispersion in relatively large crystal phase, whereby a polyester film superior in anti-whitening property, which shows the object half value width (l/h) of a recrystallization peak obtained by a differential scanning calorimeter (DSC) by lowering temperature of not more than 0.25, can be obtained. Therefore, addition of a material that becomes a nucleating agent for crystallization affords more preferable results. As such nucleating agent, any of organic fine particles and inorganic fine particles can be used, which are exemplified by silica, kaolin, calcium carbonate, titanium dioxide, polyethylene is glycol and the like, with preference given to talc. The amount of addition is suitably about 0.0001-0.1 wt % of the entire film.

The reduced viscosity ($\eta$sp/c) of the polyester film of the present invention is preferably not less than 0.80, more preferably not less than 0.85, further preferably not less than 0.90, most preferably not less than 0.95. When it is less than 0.80, a film after lamination on a metal sheet has insufficient hardness, which causes easy damage during processing, deformation of aluminum and steel sheet during can making, and partial destruction. When the reduced viscosity satisfies such values and recrystallization peak temperature (Tc2) satisfies the aforementioned numerical figures, the film comes to have further improved scratch resistance.

As long as the polyester film of the present invention meets the above-mentioned conditions, it can be produced by general film forming facility by inflation methods, simultaneous biaxial drawing methods, sequential biaxial drawing methods and the like. In addition, a melt extruded sheet may be used without drawing or subjected to uniaxial drawing.

In the present invention, moreover, a heat treatment is preferably applied at 140-270° C., preferably 140-200° C. after completion of drawing. In this case, a heat treatment while relaxing by not less than 2% in the longitudinal and/or transverse direction improves adhesiveness of the film to a metal sheet and can making operability.

The polyester film of the present invention preferably has a thickness of 3-1000 μm, more preferably 5-70 μm. Generally, a lubricant is added to a polyester and formed to give a film. As such lubricant, inorganic lubricants such as silica, kaolin, clay, calcium carbonate, calcium terephthalate, aluminum oxide, titanium oxide, calcium phosphate and the like, organic lubricants such as silicone particles and the like can be mentioned, with preference given to inorganic lubricants. These are added in a proportion of 0.01-5 wt %, preferably 0.02-0.2 wt % of the total weight of the polyester starting materials to be blended. The polyester film of the present invention can contain additives as necessary, besides the lubricant, such as stabilizer, coloring agent, antioxidant, antifoaming agent, antistatic agent, and the like.

When a film laminated metal sheet is prepared using the polyester film of the present invention, a roller or a metal sheet is heated to 150-270° C., the metal sheet and a polyester film are adhered via the roller, cooled rapidly, and at least a surface layer of the polyester film in contact with the metal sheet is melted and welded. The lamination rate is generally 1-200 m/min, preferably 2-150 m/min.

The polyester film of the present invention is used as a film for packaging of various foods, general industrial purposes, optical use, electric materials and form processing. To be specific, it is preferable for general packaging, antistatic purpose, gas barrier, metal lamination, heat sealing, antifog, metal vapor deposition, easy tearing, easy opening, bag making and packaging, retort packaging, boil packaging, drug packaging, easy adhesion, magnetic recording, capacitor, ink ribbon, transfer, adhesive label, stamping foil, gold and silver threads, tracing material, release, shrinkable film and the like, and particularly preferable for form processing (forming material for forming a film alone to give object article) and metal lamination (constituent material for film laminated metal sheet).

In the present specification, the properties and tests were measured and evaluated according to the following methods.

1. Reduced Viscosity

Reduced Viscosity ($\eta sp/C$)

Polymer (0.125 g) was dissolved in 25 ml of phenol/tetrachloroethane=6/4 (weight ratio) and measured at 25° C. using a Ubbelohde viscometer, wherein the unit is dl/g.

2. Melting Point of Polyester, Crystallization Temperature of Film and Half value Width of Crystallization Peak Using DSC 3100S manufactured by Rigaku Corporation, a polyester film was placed in a sample pan, a lid was put on the pan, the temperature was raised under a nitrogen gas atmosphere from room temperature to 280° C. at a temperature rise rate of 20° C./min, and the temperature of the peak top of the melting peak that appears by temperature rise (temperature of peak top on low temperature side (TmL), temperature of peak top on high temperature side (TmH)) was taken as the melting point of the polyester blend.

A sample that reached 280° C. was maintained as it was for 1 min, thereafter cooled to room temperature at a rate of 20° C./min and a crystallization peak (chart) was measured wherein peak top temperature was Tc2. A half value width (l/h) was calculated by dividing temperature width 1 at a height of 0.5 h by height h, wherein a height from a base line to a peak top in this peak (chart) was h.

3. Whitening of Film

A film was laminated on an aluminum sheet under the following conditions, and left standing in a gear oven for 1 min at 280° C. and 290° C. (two levels). Then air at 25° C. was blown against the film surface of the laminated sheet at wind speed of 20 m/min for cooling and the film was visually evaluated.

(Laminate Conditions)

laminate temperature: 220° C.

linear pressure: 10N/cm (Evaluation)

⊙ . . . No whitening was observed at all before and after heat treatment, and the (level of) gloss of the film was high.

○ . . . Whitening was observed somewhat, but the (level of) gloss of the film surface was high.

Δ . . . Whitening was observed and the (level of) gloss of the film surface was low.

X . . . Whitening was remarkable and the (level of) gloss of the film surface was low.

4. Hardness of Film

A film surface of the laminated sheet heated and cool-treated in 3. was rubbed hard with a pencil having a sharp point, and evaluated based on the highest hardness of a pencil that did not give a scratch then.

5. Can Making Property

A film was laminated on an aluminum sheet under the conditions of 3., treated at 240° C., a can was formed, the presence of breakage of the film such as detachment, cut, crack and the like was observed visually and with a fluorescence microscope (magnification x80) and evaluated based in the following standard.

⊙ . . . Of 100 cans, no breakage in not less than 95 cans.

○ . . . Of 100 cans, no breakage in 80-94 cans.

Δ . . . Of 100 cans, no breakage in 70-79 cans.

X . . . Of 100 cans, some breakage in not less than 31 cans.

The present invention is explained in more detail by referring to Examples.

EXAMPLE 1

As polyester A, polyethylene terephthalate (reduced viscosity 0.75, catalyst was germanium dioxide) containing in advance 2000 ppm of silica (Silysia 310 manufactured by Fuji Silysia Chemical Ltd.) added during polymerization was fed into a 60 mm$\phi$ extruder I (L/D=29, compression ratio 4.2) and melted at 275° C. As polyester B, 300 ppm of polybutylene terephthalate (1200S manufactured by Toray Industries, Inc., reduced viscosity 1.30) and an organic phosphorus compound (Adeka Stab PEP-45 manufactured by Asahi Denka Co., Ltd.) were fed into a different 60 mm$\phi$ extruder II (L/D=29, compression ratio 4.2) and melted at 240° C. Thereafter the molten products from extruder I and extruder II were led in a molten state to a 90 mm$\phi$ extruder III (L/D=25, L/D of compression part=12, compression ratio 1.5) such that the amount ratio becomes (I/II)=4/6 (weight ratio), fed, mixed, melted and extruded from a T-die to give a 200 μm thick non-oriented sheet. The temperature then of the cylinder part and the filter part (200 mesh) of extruder III was set to 260° C., the temperature from the tip of the screw of the extruder to T-die was set to 255° C. and the temperature of the resin that came out from a T-die was set to 257° C. In addition, the pressure of the resin immediately before entering the T-die was set to 8.8 MPB (90 kgf/cm$^2$).

This non-oriented sheet was led to a roll drawing machine, drawn 3.3 times in the longitudinal direction at 70° C., further drawn 3.5 times in the transverse direction on a tenter at 95° C. and subjected to thermosetting at 150° C. in situ while relaxing by 3% in the transverse direction in the tenter to give a 17 μm thick film.

EXAMPLE 2

In the same manner as in Example 1 except that the starting material of extruder II was polybutylene terephthalate (1200S manufactured by Toray Industries, Inc., reduced viscosity 1.30) prekneaded with 300 ppm of an organic phosphorus compound (Adeka Stab PEP-45 manufactured by Asahi Denka Co., Ltd.) and 500 ppm of talc, as polyester B, a film was obtained. The temperature of the resin that came out from a T-die was 258° C.

COMPARATIVE EXAMPLE 1

In the same manner as in Example 1 except that the temperature of the filter part of extruder III was set to 285° C., the temperature from the tip of screw of the extruder III to T-die was set to 282° C. and the temperature of the resin that finally came out from a T-die was set to 266° C., a film was obtained.

EXAMPLE 3

In the same manner as in Example 1 except that the compression ratio of extruder III was set to 4.0, a film was obtained. While the conditions of temperature setting and the like were completely the same as in Example 1, the temperature of the resin that came out from a T-die was 263° C.

COMPARATIVE EXAMPLE 2

In the same manner as in Example 1 except that the polyesters A, B and organic phosphorus compound used in Example 1 were fed as pellets into extruder III (L/D=25, compression ratio 4.0) such that the composition ratio became the same as in Example 1, and the temperature conditions were the same as in Example 1, a film was obtained. While the temperature conditions were the same as in Example 1, the temperature of the resin that came out from a T-die was 265° C.

EXAMPLE 4

In the same manner as in Example 1 except that polytrimethylene terephthalate (reduced viscosity 0.98) was used instead of polybutylene terephthalate, a film was obtained. The temperature of the resin that came out from a T-die was 260° C.

EXAMPLE 5

In the same manner as in Example 1 except that a static mixer (N20 manufactured by Noritake Co., Limited, number of elements 12, cylinder temperature 258° C.) was used instead of extruder III, a film was obtained. The temperature of the resin that came out from a T-die was 258° C.

EXAMPLE 6

After obtaining a 38 μm thick film by a method similar to that in Example 1, the film was formed at 90° C. using a metal mold to give a surface cover (depth 5 mm×width 50 mm×length 50 mm) of liquid crystal for mobile phone. It was confirmed to be fine, free of whitening and fine for form processing.

COMPARATIVE EXAMPLE 3

In the same manner as in Comparative Example 2 except that polyethylene terephthalate containing true spherical silica having an average particle size of 1.5 μm and polybutylene terephthalate were mixed (dry blend) at 42:58 (weight ratio) and fed into extruder III (L/D=25, L/D of compression part=12, compression ratio 4.0) as pellets and the temperature was exclusively set to 290° C., a 12 μm film was obtained. The temperature of the resin that came out from a T-die was 290° C. The melting point peak seen was only one by DSC, possibly because the resin temperature was high.

COMPARATIVE EXAMPLE 4

Polyethylene terephthalate (30 wt %, reduced viscosity 0.76 (intrinsic viscosity 0.67)) containing 0.1 wt % of silica having an average particle size of 1.0 μm and polybutylene terephthalate (Novadure 5009AS manufactured by Mitsubishi Engineering-Plastics Corporation, 70 wt %) were fed into an extruder. This extruder had a slow compression screw of 75 mmφ, L/D=45, compression ratio 3.5, L/D of compression part=30. In the same manner as in Example 1 except that the temperature was exclusively set to 265° C., a 12 μm film was obtained. The temperature of the resin that came out from a T-die was 290° C. While two melting point peaks were seen by DSC, the half value lo width of the recrystallization peak at a decreasing temperature was broad and whitening was seen in many points, possibly due to the high compression ratio and slow compression screw.

COMPARATIVE EXAMPLE 5

Polyethylene terephthalate (50 wt %, reduced viscosity 0.80 (intrinsic viscosity 0.70)) containing 0.1 wt % of silica having an average particle size of 1.0 μm and polybutylene terephthalate (Novadure 5010 manufactured by Mitsubishi Engineering-Plastics Corporation, 50 wt %) were fed into an extruder. This extruder was a vent-type extruder (PCM-45 manufactured by Ikegai Corporation) and the mixture was extruded from a T-die. The temperature of the extruder was exclusively set to 280° C. The temperature of the resin that came out from the T-die was also 280° C. This was drawn 3.4 times in the longitudinal direction at 68° C., then drawn 4.0 times in the transverse direction at 80° C. on a tenter, and successively thermoset in a tenter at 240° C. for 1 sec, and further transversely relaxed by 5% at 160° C. to give a 25 μm thick film. While two melting point peaks were seen by DSC, the half value width of the recrystallization peak at a decreasing temperature was broad and whitening was seen many times, possibly due to a somewhat higher temperature and the twin-screw extruder.

EXAMPLES 7, 8

In the same manner as in Example 1 except that the amounts of resins from extruder I and extruder II were set to 85:15 and 20:80 (weight ratio), respectively, a film was obtained.

EXAMPLE 9

In the same manner as in Example 1 except that polyhexamethylene terephthalate having a reduced viscosity of 0.85 was used instead of polybutylene terephthalate and the ratio of the resins from extruder I and extruder II was set to 90:10 (weight ratio), a film was obtained.

EXAMPLE 10

In the same manner as in Example 1 except that polyethylene-2,6-naphthalate having a reduced viscosity of 0.88 was used instead of polybutylene terephthalate and the ratio of the resins from extruder I and extruder II was set to 90:10 (weight ratio), a film was obtained.

EXAMPLE 11

In the same manner as in Example 2 except that the thermosetting was performed at 220° C., a film was obtained.

COMPARATIVE EXAMPLES 6, 7

In the same manner as in Comparative Example 4 except that only polybutylene terephthalate containing 0.1 wt % of silica or only polybutylene terephthalate containing 0.1 wt % of silica was used as a starting material, a film was obtained.

EXAMPLE 12

In the same manner as in Example 1 except that polyesters A, B and an organic phosphorus compound were fed into an extruder such that the composition ratio became the same as in Example 1, and extruded under the same temperature conditions as in Example 1, a film was obtained. This extruder had a screw of 90 mmφ, L/D=25, compression ratio 1.5, L/D of compression part=12 with a compression part of a double flight type. While the temperature conditions were set the same as in Example 1, the temperature of the resin that came out from a T-die was 257° C.

The production conditions of the polyester films produced in the above Examples 1-5, 7-12 and Comparative Examples 1-7 are shown in Table 1, and property values and test results are shown in Table 2.

TABLE 1

|  |  | Extruder I | Extruder II | Kind | Extruder III | | | | |
|---|---|---|---|---|---|---|---|---|---|
|  |  |  |  |  | Compression ratio | Cylinder-filter | T-die | Resin temperature | TS |
| Example 1 | starting material | PET/silica | PBT/phosphorus | I + II = 40/60 | 90φ |  |  |  |  |
|  | temperature | 275° C. | 240° C. |  | Uniaxial 1.5 | 260° C. | 255° C. | 255° C. | 150° C. |
| Example 2 | starting material | PET/silica | PBT/phosphorus/talc | I + II = 40/60 | 90φ |  |  |  |  |
|  | temperature | 275° C. | 240° C. |  | Uniaxial 1.5 | 260° C. | 255° C. | 255° C. | 150° C. |
| Comp. Ex. 1 | starting material | PET/silica | PBT/phosphorus | I + II = 40/60 | 90φ |  |  |  |  |
|  | temperature | 275° C. | 240° C. |  | Uniaxial 1.5 | 285° C. | 282° C. | 266° C. | 150° C. |
| Example 3 | starting material | PET/silica | PBT/phosphorus | I + II = 40/60 | 90φ |  |  |  |  |
|  | temperature | 275° C. | 240° C. |  | Uniaxial 4.0 | 260° C. | 255° C. | 263° C. | 150° C. |
| Comp. Ex. 2 | starting material | Not used | Not used | PET/PBT/silica/phosphorus | 90φ |  |  |  |  |
|  | temperature |  |  |  | Uniaxial 4.0 | 260° C. | 255° C. | 265° C. | 150° C. |
| Example 4 | starting material | PET/silica | PTT/phosphorus | I + II = 40/60 | 90φ |  |  |  |  |
|  | temperature | 275° C. | 240° C. |  | Uniaxial 1.5 | 260° C. | 255° C. | 260° C. | 150° C. |
| Example 5 | starting material | PET/silica | PBT/phosphorus | I + II = 40/60 | Static mixer |  |  |  |  |
|  | temperature | 275° C. | 240° C. |  |  | 258° C. | 255° C. | 258° C. | 150° C. |
| Comp. Ex. 3 | starting material | Not used | Not used | PET/PBT/silica | 42 (with silica)/58 |  |  |  |  |
|  | temperature |  |  |  | Uniaxial 4.0 | 290° C. | 290° C. | 290° C. | 190° C. |
| Comp. Ex. 4 | starting material | Not used | Not used | PET/PBT/ | 75φ |  |  |  |  |
|  | temperature |  |  |  | Uniaxial 3.5 | 265° C. | 265° C. | 265° C. | 150° C. |
| Comp. Ex. 5 | starting material | Not used | Not used | PET/PBT | PCM45 |  |  |  |  |
|  | temperature |  |  |  | Biaxial vent | 280° C. | 280° C. | 280° C. | 240° C. |
| Example 7 | starting material | PET/silica | PBT/phosphorus | I + II = 85/15 | 90φ |  |  |  |  |
|  | temperature | 275° C. | 240° C. |  | Uniaxial 1.5 | 260° C. | 255° C. | 255° C. | 150° C. |
| Example 8 | starting material | PET/silica | PBT/phosphorus | I + II = 20/80 | 90φ |  |  |  |  |
|  | temperature | 275° C. | 240° C. |  | Uniaxial 1.5 | 260° C. | 255° C. | 255° C. | 150° C. |
| Example 9 | starting material | PET/silica | PHT/phosphorus | I + II = 90/10 | 90φ |  |  |  |  |
|  | temperature | 275° C. | 210° C. |  | Uniaxial 1.5 | 260° C. | 255° C. | 255° C. | 150° C. |
| Example 10 | starting material | PET/silica | PEN | I + II = 90/10 | 90φ |  |  |  |  |
|  | temperature | 275° C. | 265° C. |  | Uniaxial 1.5 | 265° C. | 265° C. | 265° C. | 150° C. |
| Example 11 | starting material | PET/silica | PBT/phosphorus/talc | I + II = 40/60 | 90φ |  |  |  |  |
|  | temperature | 275° C. | 240° C. |  | Uniaxial 1.5 | 260° C. | 255° C. | 255° C. | 220° C. |
| Comp. Ex. 6 | starting material | Not used | Not used | PET/silica | 90φ |  |  |  |  |
|  | temperature |  |  |  | Uniaxial 4.0 | 275° C. | 275° C. | 275° C. | 150° C. |
| Comp. Ex. 7 | starting material | Not used | Not used | PBT/silica | 90φ |  |  |  |  |
|  | temperature |  |  |  | Uniaxial 4.0 | 260° C. | 255° C. | 255° C. | 150° C. |
| Example 12 | starting material | Not used | Not used | PET/PBT/silica/phosphorus | 90φ |  |  |  |  |
|  | temperature |  |  |  | Uniaxial 1.5 | 260° C. | 255° C. | 257° C. | 150° C. |

* In the Table, symbol Ts shows heat setting temperature.

TABLE 2

| | ηsp/c | TmL (° C.) | TmH (° C.) | Tc2 (° C.) | Half value width | Whitening 280° C. | Whitening 290° C. | Hardness | Can formability |
|---|---|---|---|---|---|---|---|---|---|
| Example 1 | 0.94 | 221 | 252 | 191 | 0.19 | ⊙ | ○ | 3H | ⊙ |
| Example 2 | 0.95 | 221 | 254 | 195 | 0.18 | ⊙ | ⊙ | 3H | ⊙ |
| Comp. Ex. 1 | 0.79 | 223 | 247 | 179 | 0.31 | X | X | HB | ⊙ |
| Example 3 | 0.84 | 222 | 249 | 184 | 0.24 | ○ | X | 2H | ⊙ |
| Comp. Ex. 2 | 0.88 | 223 | 252 | 176 | 0.39 | X | X | H | ⊙ |
| Example 4 | 0.88 | 231 | 250 | 186 | 0.22 | ○ | Δ | 2H | ⊙ |
| Example 5 | 0.93 | 221 | 253 | 191 | 0.19 | ⊙ | ○ | 3H | ⊙ |
| Comp. Ex. 3 | 0.75 | Not seen | 251 | 166 | 0.41 | X | X | HB | ⊙ |
| Comp. Ex. 4 | 0.79 | 220 | 250 | 179 | 0.32 | Δ | X | H | ⊙ |
| Comp. Ex. 5 | 0.82 | 218 | 250 | 175 | 0.37 | X | X | 2H | ⊙ |
| Example 7 | 0.83 | 220 | 251 | 197 | 0.12 | ⊙ | ⊙ | 3H | ○ |
| Example 8 | 0.95 | 219 | 252 | 191 | 0.19 | ⊙ | ○ | 2H | ⊙ |
| Example 9 | 0.82 | 186 | 250 | 184 | 0.23 | ○ | X | H | ○ |
| Example 10 | 0.88 | 254 | 260 | 183 | 0.24 | ○ | X | 3H | ○ |
| Example 11 | 0.95 | 221 | 253 | 194 | 0.18 | ⊙ | ⊙ | 3H | ○ |
| Comp. Ex. 6 | 0.71 | Not seen | 256 | 199 | 0.11 | ⊙ | ⊙ | 3H | X |
| Comp. Ex. 7 | 0.95 | 223 | Not seen | 167 | 0.31 | X | X | 3H | ○ |
| Example 12 | 0.81 | 219 | 249 | 181 | 0.25 | ○ | X | H | ○ |

INDUSTRIAL APPLICABILITY

According to the present invention, a polyester film superior in mechanical characteristic and design property and having high crystallinity, which can be used alone or adhered to a metal sheet and which is free of whitening even when the film is heat treated at near or not lower than the melting point can be obtained, and further, a polyester film having such superior resistance to whitening (design property), which is not easily damaged, can be obtained.

The polyester film of the present invention can be applied as a film for various food packagings, general industrial purposes, optical use, electric material and form processing, and is particularly suitable for general packaging, antistatic purpose, gas barrier, metal lamination, heat sealing, antifog, metal vapor deposition, easy tearing, easy opening, bag making and packaging, retort packaging, boil packaging, drug packaging, easy adhesion, magnetic recording, capacitor, ink ribbon, transfer, adhesive label, stamping foil, gold and silver threads, tracing material, release, shrinkable film and the like, and particularly preferable for metal lamination (constituent material for film laminated metal sheet).

This application is based on a patent application No. 5098/2002 filed in Japan, the contents of which are hereby. incorporated by reference.

The invention claimed is:

1. A film made from a polyester resin composition comprising 10-90 wt % of polyester (A) comprising ethylene terephthalate as a main constituent component and 90-10 wt % of crystalline polyester (B) different from said polyester (A), which film shows a half value width of recrystallization peak obtained by a differential scanning calorimeter (DSC) by lowering temperature of not more than 0.22;
wherein crystalline polyester (B) is a polyester selected from polybutylene terephthalate (PBT) and polytrimethylene terephthalate (PTT).

2. The polyester film of claim 1, wherein a peak temperature (Tc2) of the recrystallization peak is not less than 180° C.

3. The polyester film of claim 1, wherein the polyester film has a reduced viscosity of not less than 0.80.

4. The polyester film of claim 1, wherein the process of forming the film comprises:
   individually melting polyester A and polyester B in separate extruders; and
   mixing polyester A and polyester B in a mixing extruder after melting polyester A and polyester B;
   wherein the mixing extruder has a compression ratio of 1.1 to 3.8 and a ratio of an effective length (L) to an average outer diameter (D) of a screw of the mixing extruder (L/D) of 20 to 35; and the forming temperature in the mixing extruder is not more than 265° C.

5. The polyester film of claim 1, wherein the process of forming the film comprises:
   individually melting polyester A and polyester B in separate extruders; and
   mixing polyester A and polyester B in a mixing extruder after melting polyester A and polyester B;
   wherein the mixing extruder has a compression ratio of 1.1 to 3.8 and a ratio of an effective length (L) to an average outer diameter (D) of a screw of the mixing extruder (L/D) of 20 to 35; and the forming temperature in the mixing extruder is not more than 265° C.; and
   wherein the polyester resin composition further comprises an organic phosphorous compound.

6. The polyester film of claim 1, further comprising silica.

* * * * *